United States Patent
Jain et al.

(10) Patent No.: US 12,217,017 B2
(45) Date of Patent: Feb. 4, 2025

(54) TRANSLATION OF TEXT DEPICTED IN IMAGES

(71) Applicant: GOOGLE LLC, Mountain View, CA (US)

(72) Inventors: Puneet Jain, Saratoga, CA (US); Orhan Firat, Mountain View, CA (US); Sihang Liang, Princeton, NJ (US)

(73) Assignee: Google LLC, Mountain View, CA (US)

( * ) Notice: Subject to any disclaimer, the term of this patent is extended or adjusted under 35 U.S.C. 154(b) by 279 days.

(21) Appl. No.: 17/791,409

(22) PCT Filed: Jan. 8, 2020

(86) PCT No.: PCT/US2020/012646
§ 371 (c)(1),
(2) Date: Jul. 7, 2022

(87) PCT Pub. No.: WO2021/141576
PCT Pub. Date: Jul. 15, 2021

(65) Prior Publication Data
US 2023/0124572 A1    Apr. 20, 2023

(51) Int. Cl.
*G06F 40/58*    (2020.01)
*G06V 10/44*    (2022.01)
(Continued)

(52) U.S. Cl.
CPC ............ *G06F 40/58* (2020.01); *G06V 10/454* (2022.01); *G06V 10/7715* (2022.01); *G06V 10/82* (2022.01); *G06V 20/62* (2022.01)

(58) Field of Classification Search
CPC ..... G06F 40/58; G06V 10/7715; G06V 10/82
See application file for complete search history.

(56) References Cited

U.S. PATENT DOCUMENTS

2016/0371256 A1 * 12/2016 Mauser ................. G06F 40/58
2018/0144208 A1    5/2018 Lu et al.
(Continued)

FOREIGN PATENT DOCUMENTS

WO    WO 2018213840 A1    11/2018

OTHER PUBLICATIONS

Zhou, X., Ylmaz, E., Long, Y., Li, Y., & Li, H. (2020). Multi-encoder-decoder transformer for code-switching speech recognition. arXiv preprint arXiv:2006.10414. (Year: 2020).*

(Continued)

*Primary Examiner* — Ibrahim Siddo
(74) *Attorney, Agent, or Firm* — Fish & Richardson P.C.

(57) ABSTRACT

Methods, systems, and apparatus, including computer programs encoded on a computer storage medium, that translate text depicted in images from a source language into a target language. Methods can include obtaining a first image that depicts first text written in a source language. The first image is input into an image translation model, which includes a feature extractor and a decoder. The feature extractor accepts the first image as input and in response, generates a first set of image features that are a description of a portion of the first image in which the text is depicted is obtained. The first set of image features are input into a decoder. In response to the input first set of image features, the decoder outputs a second text that is a predicted translation of text in the source language that is represented by the first set of image features.

19 Claims, 3 Drawing Sheets

(51) Int. Cl.
*G06V 10/77* (2022.01)
*G06V 10/82* (2022.01)
*G06V 20/62* (2022.01)

(56) References Cited

U.S. PATENT DOCUMENTS

2019/0286708 A1   9/2019   Kalchbrenner et al.
2021/0215481 A1*   7/2021   Zhai ..................... G06V 10/25

OTHER PUBLICATIONS

Li et al., "Towards end-to-end text spotting with convolutional recurrent neural networks." Submitted on Jul. 2017, arXiv:1707.03985v1, 14 pages.
Office Action in European Appln. No. 20703856.3, dated Apr. 14, 2023, 6 pages.
International Preliminary Report on Patentability in International Appln. No. PCT/US2020/012646, dated Jul. 21, 2022, 10 pages.
International Search Report and Written Opinion in International Appln. No. PCT/US2020/012646, dated Sep. 25, 2020, 17 pages.
Ma et al., "Mobile camera based text detection and translation," Stanford Stacks, Dec. 31, 2011, 5 pages.
Zhen et al., "Towards end-to-end scene text spotting by sharing convolutional feature map," Presented at 2019 IEEE 5th International Conference on Computer and Communications (ICCC), Chengdu, China, Dec. 6, 2019, pp. 1814-1820.
Zhou et al., "A visual attention grounding neural model for multimodal machine translation," arXiv, Aug. 24, 2018, 10 pages.

* cited by examiner

TRANSLATION OF TEXT DEPICTED IN IMAGES

CROSS-REFERENCE TO RELATED APPLICATION

This application is a National Stage Application under 35 U.S.C. §371 and claims the benefit of International Application No. PCT/US2020/012646, filed on Jan. 8, 2020. The disclosure of the prior application is considered part of and is incorporated by reference in the disclosure of this application.

BACKGROUND

This specification relates to translation of text depicted in images from one language (also referred to as a source language) into another language (also referred to as a target language).

Images can depict text that is written in a source language. It is often desirable to translate the text depicted in the image from the source language into the target language. To accomplish this, conventional systems generally use at least two models: an optical character recognition (OCR) model and a machine translation model. The OCR model processes the image to recognize text depicted in the image, and the recognized text is then input into a machine translation model that translates the recognized text into the target language.

SUMMARY

In general, one innovative aspect of the subject matter described in this specification can be embodied in methods that can include the operations of obtaining a first image that depicts first text written in a source language; inputting the first image into an image feature extractor that is trained to extract, from an input image, a set of image features that are a description of a portion of the input image in which the text is depicted; obtaining, from the feature extractor and in response to inputting the first image into the feature extractor, a first set of image features representing the first text present in the first image; inputting the first set of image features into a decoder, wherein the decoder is trained to infer text in a target language from an input set of image features, wherein the inferred text is a predicted translation of text represented by the input set of image features; and obtaining, from the decoder and in response to inputting the first set of image features into the decoder, a second text that is in a target language and is predicted to be a translation of the first text. Other embodiments of this aspect include corresponding systems, devices, apparatus, and computer programs configured to perform the actions of the methods. The computer programs (e.g., instructions) can he encoded on computer storage devices.

These and other embodiments can each optionally include one or more of the following features.

In some implementations, methods can include training the feature extractor using a set of input training images that depict training text in the source language and corresponding sets of training image features, Wherein each set of training image features is a description of a portion of the input image in which the training text is depicted.

In some implementations, the decoder can include a text-to-text translation model.

In some implementations, methods can include training the decoder, which can include the operations of training the text-to-text translation model to translate text written in the source language into text in the target language, wherein the text-to-text translation model is trained using a set of input training text data in the source language and a corresponding set of output training text data that is a translation of the input training text data from the source language into the target language; and training the trained text-to-text translation model to output text data in a target language that is a predicted translation of text represented by an input set of image features that represent text in an input image, wherein the trained text-to-text translation model is trained using a set of input training images that depict training text in a source language and a corresponding set of text data that is a translation in a target language of the training text depicted in the input training images.

In some implementations, the feature extractor can be a convolution neural network (CNN) with 53 layers of convolution, residual, and pooling.

In some implementations, the decoder can be a 6-layer multi-head transformer decoder and the text-to-text translation model is a transformer neural machine translation model.

Particular embodiments of the subject matter described in this specification can be implemented to realize one or more of the following advantages. For example, the innovations described in this specification can utilize a single end-to-end image translation model to translate text depicted in an image from a source language into a target language, as compared with conventional systems that utilize multiple models, such as an OCR model and a machine translation model. By utilizing a single end-to-end model, the techniques described in this specification are more resource efficient (i.e., they utilize less computer processing and memory requirements) in comparison to conventional systems. Relatedly, the single end-to-end image translation model is more easily distributed to end-user devices in contrast with the two or more models of conventional systems. This is because the single end-to-end image translation model is expected to have less dependencies (relative to conventional systems with two models, where one model inter-depends on another model) and fewer resource requirements (i.e., hardware specifications, dependency packages, etc.).

Moreover, the techniques described in this specification also enable improved conversion of text represented in input images to translated text than conventional systems. Conventional systems generally use two distinct and unrelated models (an OCR model and a machine translation model). The OCR model recognizes text depicted in the image, and the machine translation model translates the recognized text output by the OCR model. As such, any errors introduced by the OCR model are propagated to the machine translation. For example, the OCR model may incorrectly determine that the letter "O" in "GOOD" is a zero ("0") and thus, recognize the text as "G00D." In this case, the separate machine translation model may not be able to translate this word and thus, may incorrectly return "G00D" as the translated text. In contrast, the image translation model described in this specification accommodates for error/noise that would otherwise be introduced by the conventional OCR models. Using the above example, the image translation model described in this specification would accommodate for the OCR error (i.e., it would recognize that "G00D" refers to "GOOD" with an 80% probability) and thus, generates a translation for "GOOD" instead of "G00D." As a result, the image translation model described in this specification achieves higher translation accuracy than conventional systems.

In addition, the image translation model described in this specification processes text in the entire image as opposed to conventional OCR models that process text on a line-by-line basis. Because the image translation model described in this specification operates on the entire image, it performs translations at a block level. In doing so, the translation is more accurate than conventional systems because the translation preserves the context of a sentence that may be split across multiple lines, which may otherwise be lost when translating on a line-by-line basis (as in conventional OCR models).

The image translation model described in this specification also operates on fewer parameters than conventional systems. For example, conventional systems first use an OCR model to generate text in a source language that is predicted to be present in an input image and then a machine translation model uses this generated text to generate a translation of this text in the target language. In contrast, the end-to-end image translation model described in this specification uses fewer parameters because it directly decodes an input image that depicts input text in a source language, into text in the target language that is a translation of the input text. This further results in reduced latency for the end-to-end image translation model described in this specification relative to the multiple models used in conventional systems.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally relates to the translation of text included in images from a source language into a target language.

Figure 1:
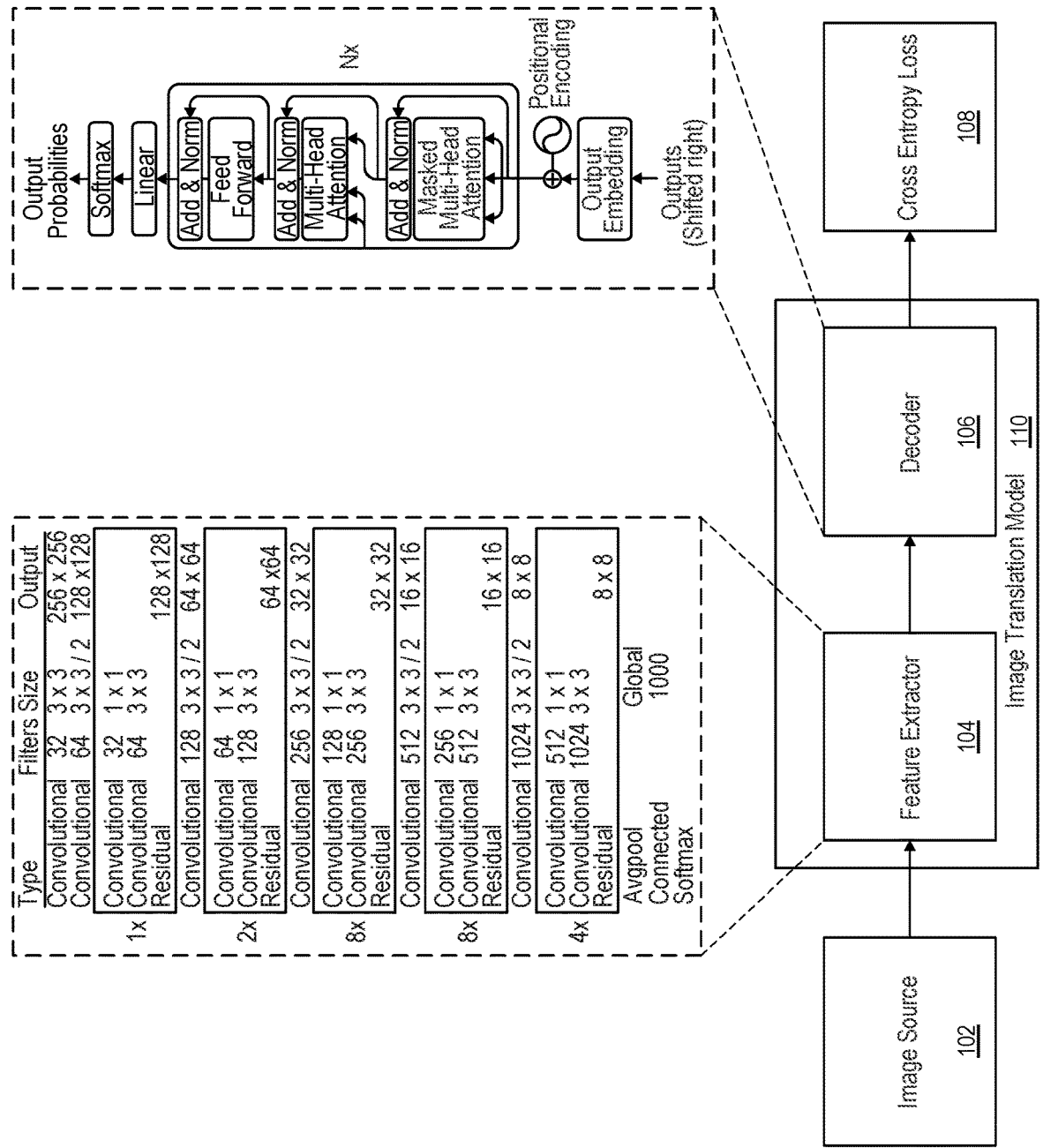
FIG. 1 is a block diagram of an example environment in which an end-to-end image translation model translates text depicted in an image.

FIG. 1 is a block diagram of an example environment 100 in which an end-to-end image translation model translates text depicted in an image.

The environment 100 includes an image source 102 and an image translation model 110. The image source 102 can be a database or repository of images, or another storage device (e.g., a user device such as a computer or a mobile device) that stores one or more images. A user device is an electronic device that is capable of requesting and receiving content over a network (such as a local area network (LAN), a wide area network (WAN), the Internet, or a combination thereof). Example user devices include personal computers, mobile communication devices, digital assistant devices, and other devices that can send and receive data over the network. A user device typically includes a user application, such as a web browser, to facilitate the sending and receiving of data over the network, but native applications executed by the user device can also facilitate the sending and receiving of content over the network. Examples of content presented at a user device 102 include webpages, word processing documents, portable document format (PDF) documents, images, videos, and search results pages.

The image translation model 110 is a model that that infers, from image features determined from a region of an image that depicts text in a source language, corresponding text in a target language (which is different from the source language). The image translation model 110 can be implemented as a supervised or unsupervised machine learning model (or another appropriate statistical model). In some implementations, the image translation model 110 of FIG. 1 is implemented as a convolution neural network.

Unlike conventional solutions, which utilize multiple models with their respective loss functions, the image translation model 110 described in this specification is an end-to-end model which utilizes only a single loss function during the image translation model 110's training. In the implementation of FIG. 1, the image translation model 110 includes two components: a feature extractor 104 and a decoder 106. The structure and operations of the feature extractor 104 and the decoder 106 are summarized below and are described in greater detail with reference to FIG. 2.

The feature extractor 104 accepts an image as an input and processes the image to identify a set of image features that are a description of a portion of the input image in which the text is depicted. The feature extractor 104 can be implemented as a convolution neural network (CNN). In some implementations, the feature extractor 104 is a CNN that is referred to as darknet-53 (which is a hybrid between another CNN referred to as darknet-19 and a residual network). In such implementations, the feature extractor includes successive 3×3 and 1×1 convolution layers with residual connections and contains 53 total layers. As such, the CNN of the feature extractor includes fifty-three (53) layers of convolution, pooling, and residual layers, as depicted in FIG. 1. The set of image features output by the feature extractor 104 are then reshaped in the form of one or more sequences to be input into the decoder 106. Other dimensions for the network can also be used.

The decoder 106 accepts the set of image features as input and outputs/generates text data in the target language that is a translation of the text depicted in the input image. In other words, the decoder 106 generates target text based on an input set of image features, without having to generate text in the source language. The decoder 106 can be implemented as a six-layer multi-head transformer decoder, which is depicted in FIG. 1. Each layer of the transformer decoder includes three sub-layers: a first sublayer that is a multi-head self-attention mechanism, a second sublayer that performs multi-head attention over the output of the feature extractor 104, and a third sublayer that is a position-wise fully connected feed-forward network. Residual connections are employed around each sublayer, and each transformer layer also starts with a layer normalization operation.

In the above-described implementation, the image translation model 110 translates text depicted in an image in one source language into one target language. In other words, the image translation model 110 only translates text in a particular source language to text in a different target language. As a result, a separate image translation model 110 would be required for (1) translating text from the same source language into a different target language; (2) translating text from a different source language into the same target language; or (3) translating text from a different source language into a different target language. Alternatively, the image translation model 110 could be trained to translate text depicted in an image from one or more source languages into one or more target languages.

Figure 2:
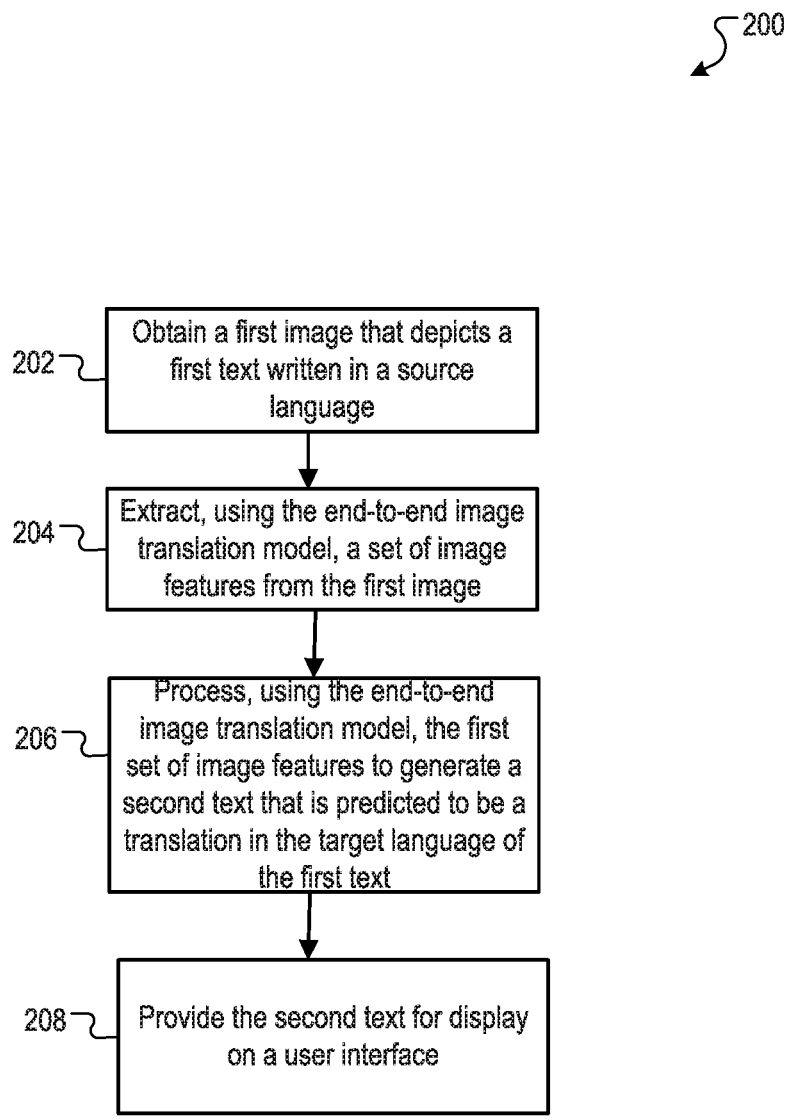
FIG. 2 is a flow diagram of an example process that translates text depicted in the image using the end-to-end image translation model of FIG. 1.

FIG. 2 is a flow diagram of an example process 200 for translating text depicted in an image from a source language to a target language. Operations of the process 200 are described below for illustration purposes only. Operations of the process 200 can be performed by any appropriate device or system, e.g., using the image translation model described in FIG. 1 or any other appropriate data processing apparatus. Operations of the process 200 can also be implemented as instructions stored on a non-transitory computer readable medium. Execution of the instructions cause one or more data processing apparatus to perform operations of the process 200.

The process 200 obtains a first image that depicts a first text written in a source language (at 202). In some implementations, the first image can be obtained from the image source 102. In some implementations, a service executing locally on a user device or on a server (that is remote from the user device) provides a user interface for display on a user device. On this user interface, the user of the user device can input (e.g., as an attachment or as a file upload) a first image (which depicts a first text in the source language) from an image source 102, such as the user device's storage (or from some other local or networked location).

In some implementations, operations 204 and 206, which are described below, are performed by the end-to-end image translation model 110 described with reference to FIG. 1.

The image translation model 110 extracts a set of image features from the first image (204). In some implementations, the process 200 inputs the first image (obtained at operation 202) into the feature extractor 104 of the image translation model 110. The feature extractor 104 is trained (as further described below) to extract, from an input image, a set of image features that are a description of a portion of the input image in which the first text is depicted. As used in this specification, an image feature is a feature of an image that generally represents the shapes, colors, and textures in the portion of the input image in which the text is depicted. The types of image features that the feature extractor 104 can extract include, but are not limited to, the beginning of a sentence and/or a paragraph, the end of a sentence, line, and/or a paragraph, the beginning or ending of a line, the spaces between words, the characters/letters/numbers that are identified at particular locations in the text (and/or the probability of each such identified character), and the words that are identified in a string of text (and the probability of each such word; in some implementations, multiple words may be predicted for a particular string of text with a probability representing a likelihood of each predicted word for that string of text). Thus, for the input first image, the feature extractor 104 extracts a. set of image features that are a description of a portion of the first image in which the text is depicted.

As one example, the feature extractor 104 may identify the text "GOOD" included in the first image as a word and may further determine that this word is either "G00D" (with two zeros) with a 20% probability or "GOOD" with a 80% probability. In such cases, the feature extractor 104 outputs both versions of the identified text. In this example, the feature extractor 104 outputs the raw image features that are extracted from the image without drawing any inferences about these features. This is different from a conventional OCR model that might infer, albeit incorrectly, that the word is "G00D." In some implementations, after the feature extractor 104 has extracted the first set of image features from the first image, the feature extractor 104 flattens this first set of image features into one or more sequences of image features.

The image translation model 110 processes the first set of image features to generate a second text that is predicted to be a translation of the first text (at 206). In some implementations, the decoder 106 of the image translation model 110 receives, as input, the one or more sequences of the first set of image features. The decoder 106 is trained (as further described below) to infer text in a target language, which is a predicted translation of text represented by the input set of image features, from an input set of image features. Thus, the decoder 106 uses the one or more sequences of the input first image features to generate a second text that is predicted to be a translation of first text from the source language into the target language.

The process 200 provides the second text for display on a user interface (at 208). In some implementations, the output of the decoder 106 is provided by the service executing locally on the user device or on the server, for display on the user interface presented on the user device.

The following paragraphs describe the training of the image translation model 110.

In some implementations, the feature extractor 104 and the decoder 106 are trained using the following set of training data that includes: (1) a set of training images in which each training image depicts input training text that is written in a source language; (2) a corresponding set of data that includes the image features that are a description of a portion of the input training images in which the input training text is depicted; and (3) a set of data that includes a set of output training texts that is each written in the target language and is a corresponding translation of an input training text.

In some implementations, at the beginning of the training, the feature extractor 104 can be randomly initialized, while the decoder 106 can be initialized from a pre-trained text-to-text translation model (e.g., a neural machine translation (NMT) model or another appropriate machine translation model). Such a text-to-translation model is pre-trained to translate text written in the source language into text in the target language. This text-to-text model is trained using a set of input training text data in the source language and a corresponding set of output training text data that is a translation of the input training text data from the source language into the target language.

The feature extractor 104 is trained using the set of training images and a corresponding set of data that includes the image features that are a description of a portion of each input training image in which input training text is depicted.

The decoder 106, which is initialized with the pre-trained text-to-text translation model, is further trained to output text in a target language that is predicted to be a translation of text in a source language that is depicted in a set of input training images. Thus, the decoder 106 is trained by training the image translation model using the set of input training images that each depict input training text in a source language and a corresponding set of text data that includes a translation in a target language of the input training text included in each of the input training images.

During training, the feature extractor 104 and the decoder 106 can be trained individually. For example, the feature extractor 104 can be trained first for a certain (n) number of iterations (or until a loss function (e.g., the cross entropy loss 108) of the image translation model is below a certain first threshold) and then the decoder 106 can be trained for a certain (n) number of iterations (or until a loss (e.g., the cross entropy loss 108) for the image translation model 110 is below a certain second threshold that can be the same as or less than the first threshold). Alternatively, the feature extractor 104 and the decoder 106 can be trained in alternating fashion. In other words, the feature extractor 104 can be trained while the decoder 106 is held steady, and vice versa. The training of the feature extractor 104 and the decoder 106 can continue for a certain number (N) total iterations or until a loss function (e.g., the overall cross entropy loss 108) of the image translation model 110 satisfies (e.g., is at or below) a pre-determined loss threshold.

Once trained, the image translation model 110 can be provided as a package on a user device, which then can be accessed locally by the on-device service referenced in operation 202. Alternatively, the trained image translation model 110 can be stored on a network server (or another cloud instance), which then can be accessed by the device's locally executing service (or the service that executes on a remote server) over a network.

Figure 3:
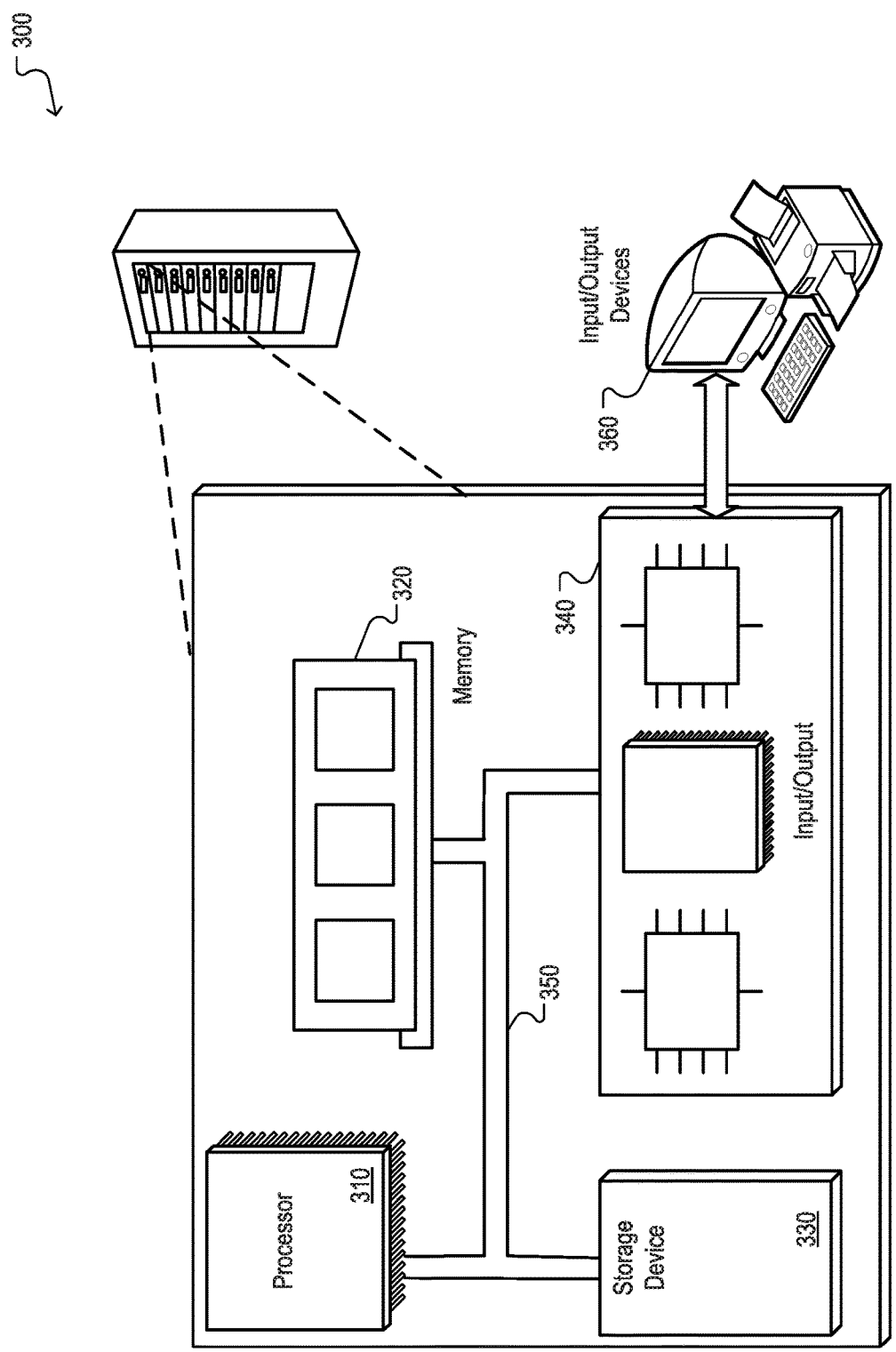
FIG. 3 is a block diagram of an example computer system.

FIG. 3 is block diagram of an example computer system 300 that can be used to perform operations described above. The system 300 includes a processor 310, a memory 320, a storage device 330, and an input/output device 340. Each of the components 310, 320, 330, and 340 can be interconnected, for example, using a system bus 350. The processor 310 is capable of processing instructions for execution within the system 300. In some implementations, the processor 310 is a single-threaded processor. In another implementation, the processor 310 is a multi-threaded processor. The processor 310 is capable of processing instructions stored in the memory 320 or on the storage device 330.

The memory 320 stores information within the system 300. In one implementation, the memory 320 is a computer-readable medium. In some implementations, the memory 320 is a volatile memory unit. In another implementation, the memory 320 is a non-volatile memory unit.

The storage device 330 is capable of providing mass storage for the system 300. In some implementations, the storage device 330 is a computer-readable medium. In various different implementations, the storage device 330 can include, for example, a hard disk device, an optical disk device, a storage device that is shared over a network by multiple computing devices (e.g., a cloud storage device), or some other large capacity storage device.

The input/output device 340 provides input/output operations for the system 300. In some implementations, the input/output device 340 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input output devices, e.g., keyboard, printer and display devices 360. Other implementations, however, can also be used, such as mobile computing devices, mobile communication devices, set-top box television client devices, etc.

Although an example processing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area. network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:
1. A computer implemented method, comprising:
 obtaining a first image that depicts first text written in a source language;
 inputting the first image into an image feature extractor of an image translation model that is trained, using a loss function, to extract, from an input image, a set of image features that are a description of a portion of the input image in which the text is depicted;

obtaining, from the feature extractor and in response to inputting the first image into the feature extractor, a first set of image features representing the first text present in the first image;

inputting the first set of image features into a decoder of the image translation model, wherein the decoder is trained, using the loss function, to infer text in a target language from an input set of image features, wherein the inferred text is a predicted translation of text represented by the input set of image features; and obtaining, from the decoder and in response to inputting the first set of image features into the decoder, a second text that is in a target language and is predicted to be a translation of the first text.

2. The computer implemented method of claim 1, further comprising:

training the feature extractor using a set of input training images that depict training text in the source language and corresponding sets of training image features, wherein each set of training image features is a description of a portion of the input image in which the training text is depicted.

3. The computer implemented method of claim 1:

wherein the decoder includes a text-to-text translation model.

4. The method of claim 3, further comprising training the decoder, wherein the training includes:

training the text-to-text translation model to translate text written in the source language into text in the target language, wherein the text-to-text translation model is trained using a set of input training text data in the source language and a corresponding set of output training text data that is a translation of the input training text data from the source language into the target language; and training the trained text-to-text translation model to output text data in a target language that is a predicted translation of text represented by an input set of image features that represent text in an input image, wherein the trained text-to-text translation model is trained using a set of input training images that depict training text in a source language and a corresponding set of text data that is a translation in a target language of the training text depicted in the input training images.

5. The computer implemented method of claim 1, wherein the feature extractor is a convolution neural network (CNN) with 53 layers of convolution, residual, and pooling.

6. The computer implemented method of claim 1, wherein the decoder is a 6-layer multi-head transformer decoder and the text-to-text translation model is a transformer neural machine translation model.

7. The computer implemented method of claim 1, wherein the decoder is a multi-layer multi-head transformer decoder and the text-to-text translation model is a transformer neural machine translation model.

8. A system, comprising:

one or more memory devices storing instructions; and one or more data processing apparatus that are configured to interact with the one or more memory devices, and upon execution of the instructions, perform operations including:

obtaining a first image that depicts first text written in a source language;

inputting the first image into an image feature extractor of an image translation model that is trained, using a loss function, to extract, from an input image, a set of image features that are a description of a portion of the input image in which the text is depicted;

obtaining, from the feature extractor and in response to inputting the first image into the feature extractor, a first set of image features representing the first text present in the first image;

inputting the first set of image features into a decoder of the image translation model, wherein the decoder is trained, using the loss function, to infer text in a target language from an input set of image features, wherein the inferred text is a predicted translation of text represented by the input set of image features; and obtaining, from the decoder and in response to inputting the first set of image features into the decoder, a second text that is in a target language and is predicted to be a translation of the first text.

9. The system of claim 8, wherein the one or more data processing apparatus are configured to perform operations further comprising:

training the feature extractor using a set of input training images that depict training text in the source language and corresponding sets of training image features, wherein each set of training image features is a description of a portion of the input image in which the training text is depicted.

10. The system of claim 8, wherein the decoder includes a text-to-text translation model.

11. The system of claim 10, wherein the one or more data processing apparatus are configured to perform operations further comprising training the decoder, the training includes:

training the text-to-text translation model to translate text written in the source language into text in the target language, wherein the text-to-text translation model is trained using a set of input training text data in the source language and a corresponding set of output training text data that is a translation of the input training text data from the source language into the target language; and training the trained text-to-text translation model to output text data in a target language that is a predicted translation of text represented by an input set of image features that represent text in an input image, wherein the trained text-to-text translation model is trained using a set of input training images that depict training text in a source language and a corresponding set of text data that is a translation in a target language of the training text depicted in the input training images.

12. The system of claim 8, wherein the feature extractor is a convolution neural network (CNN) with 53 layers of convolution, residual, and pooling.

13. The system of claim 8, wherein the decoder is a 6-layer multi-head transformer decoder and the text-to-text translation model is a transformer neural machine translation model.

14. A non-transitory computer readable medium storing instructions that, when executed by one or more data processing apparatus, cause the one or more data processing apparatus to perform operations comprising:

obtaining a first image that depicts first text written in a source language;

inputting the first image into an image feature extractor of an image translation model that is trained, using a loss function, to extract, from an input image, a set of image features that are a description of a portion of the input image in which the text is depicted;

obtaining, from the feature extractor and in response to inputting the first image into the feature extractor, a first set of image features representing the first text present in the first image;

inputting the first set of image features into a decoder of the image translation model, wherein the decoder is trained, using the loss function, to infer text in a target language from an input set of image features, wherein the inferred text is a predicted translation of text represented by the input set of image features; and obtaining, from the decoder and in response to inputting the first set of image features into the decoder, a second text that is in a target language and is predicted to be a translation of the first text.

15. The non-transitory computer readable medium of claim 14, wherein the instructions cause the one or more data processing apparatus to perform operations comprising:
training the feature extractor using a set of input training images that depict training text in the source language and corresponding sets of training image features, wherein each set of training image features is a description of a portion of the input image in which the training text is depicted.

16. The non-transitory computer readable medium of claim 14, wherein the decoder includes a text-to-text translation model.

17. The non-transitory computer readable medium of claim 16, wherein the instructions cause the one or more data processing apparatus to perform operations comprising training the decoder, wherein the training includes:
training the text-to-text translation model to translate text written in the source language into text in the target language, wherein the text-to-text translation model is trained using a set of input training text data in the source language and a corresponding set of output training text data that is a translation of the input training text data from the source language into the target language; and training the trained text-to-text translation model to output text data in a target language that is a predicted translation of text represented by an input set of image features that represent text in an input image, wherein the trained text-to-text translation model is trained using a set of input training images that depict training text in a source language and a corresponding set of text data that is a translation in a target language of the training text depicted in the input training images.

18. The non-transitory computer readable medium of claim 14, wherein the feature extractor is a convolution neural network (CNN) with 53 layers of convolution, residual, and pooling.

19. The non-transitory computer readable medium of claim 14, wherein the decoder is a 6-layer multi-head transformer decoder and the text-to-text translation model is a transformer neural machine translation model.

* * * * *